United States Patent [19]

Agarwal et al.

[11] Patent Number: 4,527,653
[45] Date of Patent: Jul. 9, 1985

[54] ROAD LOAD INSENSITIVE ELECTRIC POWER STEERING SYSTEM

[75] Inventors: Paul D. Agarwal, Troy; Roger D. Fruechte, Rochester; Alexander Kade, Detroit; Thomas A. Radomski, Utica, all of Mich.

[73] Assignee: General Motors Corporation, Detroit, Mich.

[21] Appl. No.: 572,874

[22] Filed: Jan. 23, 1984

[51] Int. Cl.³ ............... B64C 13/2; B64C 13/04; G06G 7/66; G05B 13/02
[52] U.S. Cl. .................... 180/79.1; 180/79; 244/223; 244/195; 318/457
[58] Field of Search ............ 180/79.1, 79, 131, 142; 318/489, 457; 244/175, 195, 230, 223

[56] References Cited

U.S. PATENT DOCUMENTS

| | | | |
|---|---|---|---|
| 2,642,554 | 6/1953 | MacCallum | 318/457 |
| 3,618,419 | 11/1971 | Maroshick | 244/230 |
| 3,747,876 | 7/1973 | Fortna et al. | 244/223 |
| 3,773,282 | 11/1973 | Sands et al. | 244/223 |
| 4,071,209 | 1/1978 | Hart | 244/223 |
| 4,106,728 | 8/1978 | Griffith | 244/223 |
| 4,197,577 | 4/1980 | Johnson et al. | 244/195 |
| 4,236,685 | 12/1980 | Kissel | 244/195 |

Primary Examiner—Raymond A. Nelli
Attorney, Agent, or Firm—Mark A. Navarre

[57] ABSTRACT

The torque gain of an electric motor assisted power steering system is modified as a function of the estimated level of road load friction such that the relationship between the operator exerted steering torque and the resulting rate of steer is substantially insensitive to a reduction in the level of road load. The road load is estimated as a function of the operator exerted steering torque, the torque assist provided by the electric motor, and the resulting steer rate.

2 Claims, 5 Drawing Figures

ROAD LOAD INSENSITIVE ELECTRIC POWER STEERING SYSTEM

This invention relates to an electric motor assisted power steering system and more particularly to a controller for making the response of the system insensitive to changes in the level of road load friction.

An electric power steering system of the type envisioned by this invention generally includes a torque transducer for sensing the torque exerted on the steering wheel by the operator of the vehicle, an electric motor connected to the steering linkage, and a controller for energizing the motor in relation to the output of the torque transducer to provide a steering assist torque which is proportional to and which aids the operator exerted torque. The friction between the dirigible vehicle wheels and the road surface they engage defines a road load force and hence torque which must be overcome by the operator exerted torque and the assist torque to effect a steering correction. Hereinafter, such torque or force will be referred to simply as road load.

The torque gain of the power steering system is typically chosen such that the system provides an adequate amount of steering assist when the road load is relatively high, as during parking on a dry road surface, without providing an inordinate amount of steering assist when the road load is relatively low, as during highway driving on a wet or icy road surface. To some extent, this has been accomplished in prior systems by varying the torque gain in inverse proportion to the vehicle speed. However, certain conditions result in drastically reduced levels of road load largely independent of vehicle speed. Such conditions include, for example, driving on ice or oil covered road surfaces. When such conditions are encountered, the operator of the vehicle must quickly react by reducing the torque exerted on the steering wheel to avoid oversteering. However, the conditions of reduced road load often occur intermittently and it is difficult for the operator to sense the reduced road load and react appropriately.

Accordingly, it is an object of this invention to provide an improved electric motor assisted power steering system wherein the assist torque provided by the electric motor is varied in direct relation to the magnitude of the road load torque.

It is a further object of this invention to provide an improved system of the above type wherein a road load torque term is computed in relation to the operator exerted steering torque and the resulting assist torque produced by the electric motor, and wherein the torque gain of the system is adjusted as a function of such term so that the relationship between operator exerted steering torque and the resulting steering rate is substantially insensitive to the magnitude of the road load.

These objects are carried forward with an electronic controller responsive to the operator exerted steering torque, the velocity of the steering gear, and the electric motor current. Based on the above inputs, the controller computes a road load related term and such term is used to develop a gain factor which, in turn, is used to derive the torque gain of the system. The assist torque produced by the electric motor is determined as a function of the operator exerted torque and the torque gain of the system, and the gain factor is chosen in relation to the computed road load term such that the resulting rate of steer is substantially independent of the road load. As such, the system torque gain is automatically adjusted as the road and driving conditions vary. When the level of road load decreases, either due to slippery road surfaces or increased vehicle speed, such decrease is sensed and the torque gain is reduced to decrease the amount of assist torque produced by the motor. When the road load increases, either due to highly tractive road surfaces or decreased vehicle speed, such increase is sensed and the system torque gain is increased to increase the amount of assist torque produced by the motor. Since the road load force is determined solely as a function of steering system parameters, the vehicle speed need not be separately sensed.

The nominal or unaltered system gain is made sufficiently high to result in good drivability when road load force is relatively high as during parking, and the control system of this invention operates to reduce such torque gain as a function of the sensed level of road load. As a result, the relationship between the operator exerted torque and the resulting steering rate is substantially independent of the level of road load.

IN THE DRAWINGS

FIG. 1 schematically depicts an electric power steering system and a controller therefor.

Figure 1:
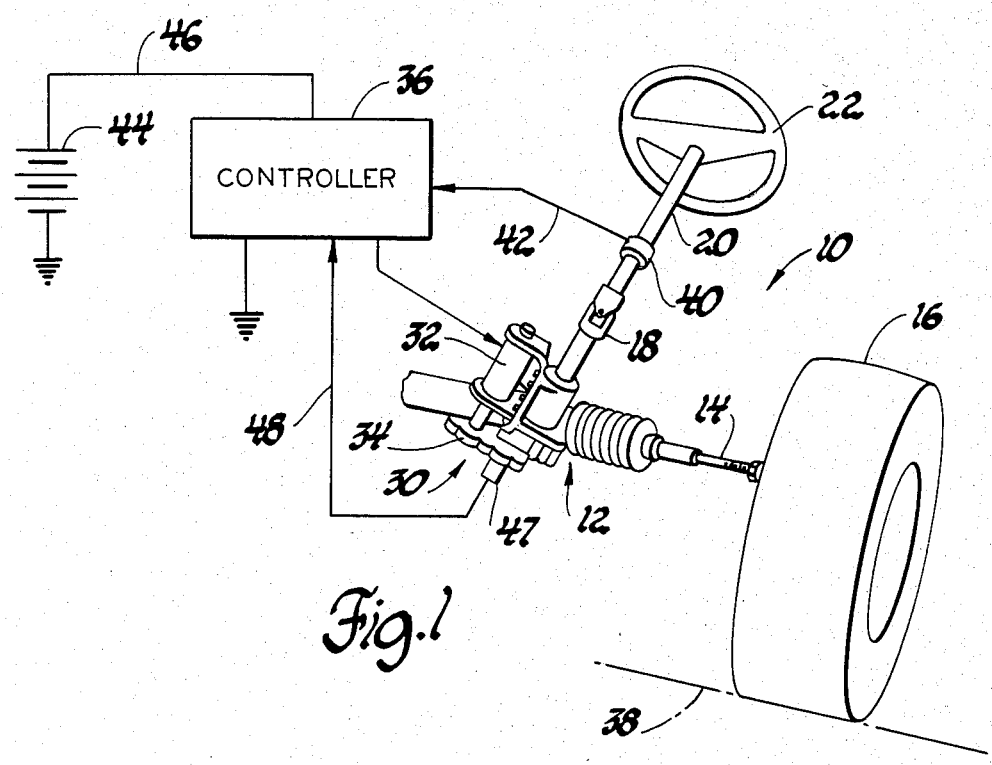

Referring now more particularly to FIG. 1, reference numeral 10 generally designates a motor vehicle power steering system of the type envisioned by this invention. The steering mechanism, which is designated by the reference numeral 12, is of the rack-and-pinion type and consists essentially of a toothed rack (not shown) and a pinion gear (also not shown) in engagement therewith. Each end of the rack is connected to a steering tie-rod 14 which, in turn, is connected to the steering knuckles (not shown) of a respective dirigible vehicle wheel 16, such that lateral movement of the rack and tie-rod 14 operates to steer the vehicle wheels 16 in unison. The pinion gear is connected through a universal joint 18 and steering column 20 to an operator manipulated steering wheel 22 so that the vehicle operator may rotate the pinion gear and thereby steer the vehicle wheel 16 by rotating the steering wheel 22.

An electric power steering torque assist mechanism is designated generally by the reference numeral 30 and includes an electric motor 32 connected through a gearbox 34 to the pinion gear of the steering mechanism 12, and a controller 36 for energizing the motor 32 during steering maneuvers in order to provide steering torque for assisting the operator of the vehicle in overcoming road load force generated by the frictional engagement of the vehicle wheels 16 and the road surface 38. A torque transducer 40 senses a steering torque applied by the operator of the vehicle to the steering wheel 22 and generates an electrical signal in accordance therewith on line 42. Line 42 is applied as an input to controller 36, which operates in response to the sensed steering torque and other steering system parameters to energize motor 32 with the vehicle battery 44 via line 46 for achieving the desired level of steering torque assist.

The torque transducer 40 may be any conventional torque transducer, such as a strain gauge or a resistive or variable reluctance mechanism responsive to the twisting of a torsion bar (not shown) in the steering column 20. In any event, the transducer output signal is variable in magnitude from a lower limit value representative of a large operator exerted steering torque in the lefthand direction through a mean value representative of no operator exerted steering torque to an upper limit value representative of a large operator exerted steering torque in the righthand direction. Circuitry for producing an output signal of the above nature is considered to be conventional and has been omitted herein for the purpose of simplicity.

A variable reluctance magnetic speed pick-up 47 is located relative to the gearbox 34 so as to sense the rotational velocity of the steering mechanism pinion gear. Since the pinion gear directly drives the steering rack, the velocity sensed by transducer 47 is directly proportional to the rate of steer. The output of transducer 47 is applied as an input to controller 36 via line 48 and is used in the development of a road load force term as will later be described.

Figure 2:
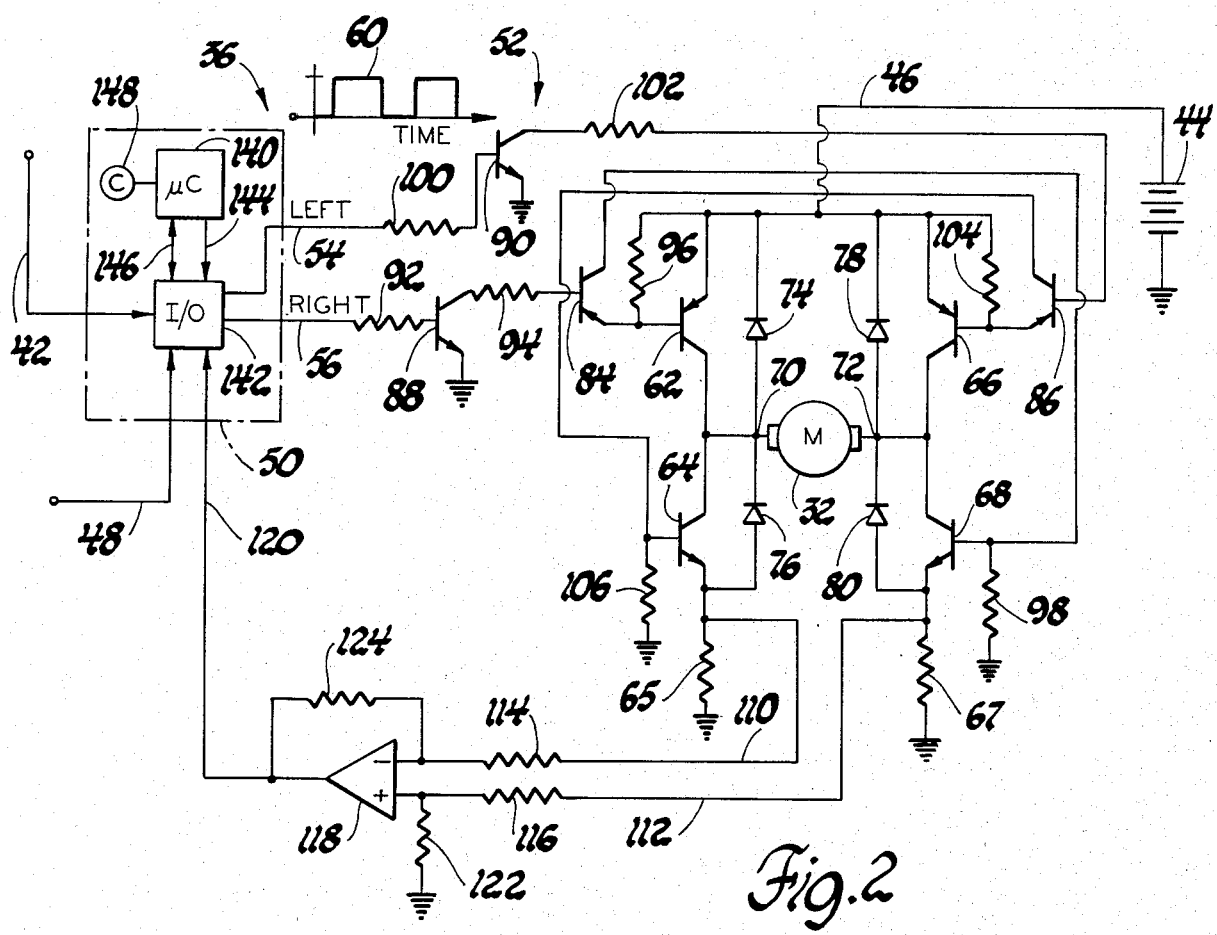
FIG. 2 is a partial circuit diagram of the controller depicted in FIG. 1 and a microcomputer-based logic unit therefor.

FIG. 2 illustrates the controller 36 of FIG. 1 in detail. Also shown in FIG. 2 are electric motor 32 and vehicle battery 44. The controller 36 may be functionally divided into two parts: a microcomputer-based logic unit 50 and a motor driver circuit 52. As shown in FIG. 1, the power for the motor driver circuit 52 is derived from vehicle battery 44 via line 46.

The microcomputer-based logic unit 50 is responsive to the torque transducer output signal on line 42 for developing a pulse-width-modulated control signal on either left output line 54 or right output line 56 to control energization of motor 32. The torque transducer output signal is compared to a reference signal indicative of zero torque (zero torque reference ZTR) and the difference therebetween is used to determine, in part, the amount of assist torque to be produced by motor 32. The sign of the difference indicates whether the operator is exerting a lefthand or righthand steering torque and the magnitude of the difference indicates the amount of the torque. If the operator applies counterclockwise torque on steering wheel 22 to effect a lefthand turning maneuver, the microcomputer-based logic unit 50 develops a pulse-width-modulated signal such as designated by the reference numeral 60 on left output line 54. If the operator applies clockwise torque on steering wheel 22 to effect a righthand steering maneuver, the microcomputer-based logic unit 50 develops a similar pulse-width-modulated signal on right output line 56. In either case, the width of the pulses developed on lines 54 or 56 are varied in direct relation to the amount of assist torque to be produced by motor 32.

In the illustrated embodiment, the electric motor 32 is depicted as a DC motor and the motor drive circuitry 52 is in the form of what is commonly referred to in the electronic art as an "H" switch. Essentially, the "H" switch comprises four power transistors 62, 64, 66 and 68 connecting the motor 32 at its terminals 70 and 72 across vehicle battery 44 and current shunts 65 and 67 such that diagonally opposed transistors may be selectively and concurrently energized to control the direction of motor current and hence the direction of motor rotation. For example, a motor current from terminal 70 to terminal 72 may be effected by biasing power transistors 62 and 68 to their conductive states, and a motor current from terminal 72 to terminal 70 may be effected by biasing power transistors 66 and 64 to their conductive states. One direction of energization produces a steering torque assist in the righthand direction while the other direction of energization produces a steering torque assist in the lefthand direction. As will become apparent, the left output line 54 and the right output line 56 of the microcomputer-based logic unit 50 are connected to the "H" switch for controlling the energization of motor 32 such that the steering assist torque provided by motor 32 aids the torque supplied by the operator of the vehicle in steering the vehicle wheels 16. A diode 74, 76, 78, 80, is connected across the emitter-collector circuit of each of the "H" switch power transistors 62, 64, 66 and 68 to protect the respective transistor at turn-off by circulating the inductive energy stored in motor 32. Such diodes are commonly called freewheeling or flyback diodes.

Driver transistors 84 and 86 are connected to diagonally opposed "H" switch power transistors such that driver transistor 84 controls the conduction of power transistors 62 and 68, and driver transistor 86 controls the conduction of power transistors 66 and 64. In turn, driver transistors 88 and 90 control the conduction of driver transistors 84 and 86, respectively. The conduction of driver transistors 88 and 90 is controlled by the logic level on right and left output lines 56 and 54, respectively.

A brief description of the relation between the microcomputer-based logic unit 50 and the driver circuitry 52 will now be given. When the operator of the vehicle exerts clockwise torque on steering wheel 22, the torque transducer 40 develops an electrical signal on line 42 in accordance therewith. In response to such signal and other steering system parameters, the microcomputer-based logic unit 50 develops a pulse-width-modulated control signal, such as depicted by the reference numeral 60 on right output line 56. As noted above, the width of the pulses is developed in relation to the magnitude of the assist torque to be produced. During such time, the left output line 54 is maintained at a logic zero voltage potential. The pulse-width modulated signal on right output line 56 is applied through resistor 92 to the base input of driver transistor 88 thereby controlling its conduction. When the pulse-width-modulated signal is at a logic 1 voltage potential, transistor 88 is biased to a conductive state. In such case, transistor 84 becomes conductive via resistor 94 and the collector-emitter circuit of transistor 88. Transistor 84 thereby completes a conduction path through battery 44 and the base emitter circuits of power transistors 62 and 68 which biases such transistors to a conductive state to energize motor 32 such that the motor current enters terminal 70 and exits terminal 72. The motor 32 and gearbox 34 are configured so that such energization produces a steering assist torque which aids the operator of the vehicle in effecting the righthand steering maneuver. Resistors 96 and 98 are connected to the base terminals of power transistors 62 and 68 and act to bias such transistors to their nonconductive states when driver transistor 84 is nonconductive.

When the pulse-width-modulated signal on right output line 56 is at a logic zero voltage potential, driver transistors 84 and 88 are biased to their nonconductive states which in turn biases power transistors 62 and 68 to their nonconductive states de-energizing motor 32. When motor 32 is so de-energized, freewheeling diodes 76 and 78 may conduct to circulate the inductive energy stored in motor 32 through battery 44.

In the manner described above, a righthand steering assist torque is provided by motor 32 so long as the microcomputer-based logic unit continues to produce a pulse-width-modulated signal on right output line 56. When the difference between the zero torque reference and the transducer output signal value is substantially zero, the microcomputer-based logic unit 50 ceases to develop pulse-width-modulated signals on right output line 56 and the energization of motor 32 is terminated.

When the operator exerts counterclockwise torque on steering wheel 22, the difference between the zero torque reference and the torque transducer output signal is negative indicating a lefthand steering maneuver, and the microcomputer-based logic unit 50 develops a pulse-width-modulated signal such as depicted by the reference numeral 60 on left output line 54. As noted above, the width of the pulses developed are in relation to the magnitude of assist torque to be produced. During such operation, right output line 56 is maintained at a logic zero voltage potential to maintain driver transistor 88 nonconductive.

When the pulse-width-modulated signal on left output line 54 is at a logic 1 voltage potential, driver transistor 90 is biased to a conductive state through resistor 100. In such case, transistor 86 becomes conductive via resistor 102 and the collector-emitter circuit of driver transistor 90. Driver transistor 86 thereby completes a conduction path through battery 44 and the base-emitter circuits of power transistors 64 and 66 which biases such transistors to their conductive states to energize steering motor 32 such that the motor current enters terminal 72 and exits terminal 70. Such energization produces a steering assist torque which aids the operator of the vehicle in effecting the lefthand steering maneuver. The resistors 104 and 106 are connected to the base terminals of power transistors 66 and 64 and act to bias such transistors to their nonconductive states when driver transistor 86 is nonconductive.

When the pulse-width-modulated signal on left output line 54 is at a logic zero voltage potential, driver transistors 90 and 86 are biased to their nonconductive states which in turn biases power transistors 64 and 66 to their nonconductive states de-energizing motor 32. When motor 32 is so de-energized, freewheeling diodes 74 and 80 may conduct to circulate the inductive energy stored in motor 32 through battery 44.

In the manner described above, a left hand steering assist torque is provided by motor 32 so long as microcomputer-based logic unit 50 continues to produce a pulse-width-modulated signal on left output line 54. When the difference between the zero torque reference and the transducer output signal is reduced substantially to zero, microcomputer-based logic unit 50 ceases to develop pulse-width-modulated signals on left output line 54 and the energization of motor 32 is terminated.

The ungrounded sides of current shunts 65 and 67 are connected via lines 110 and 112 and resistors 114 and 116 to the negative and positive inputs of operational amplifier 118 for the purpose of generating an electrical signal indicative of the motor current, such signal being applied as an input to microcomputer-based logic unit 50 via line 120. Accordingly, resistor 122 is connected between the positive input of operational amplifier 118 and ground potential, and resistor 124 is connected between the output of operational amplifier 118 and its negative input.

As indicated above, the present invention is directed to making the relationship between the operator exerted steering torque and the resulting rate of steer substantially insensitive to variations in the road load. The operation of a conventional system is graphically represented by the solid traces in FIG. 3. The traces 150, 152 and 154 describe the relationship between the steady-state pinion gear velocity or rate of steer and the operator exerted steering torque $T_L$ for various levels of road load. The trace 150 describes the relationship for a very low level of road load as might be encountered when driving on ice or oil covered road surfaces. The trace 152 describes the relationship for a moderate level of road load force as might be encountered in typical highway driving on dry road surfaces. The trace 154 describes the relationship for a high level of road load as might be encountered during parking. The significance of the traces is that the relationship between the driver exerted steering torque and the resulting rate of steer is very much a function of the road load. That is, a given level of driver exerted torque produces different depending upon the level of road load.

Figure 3:
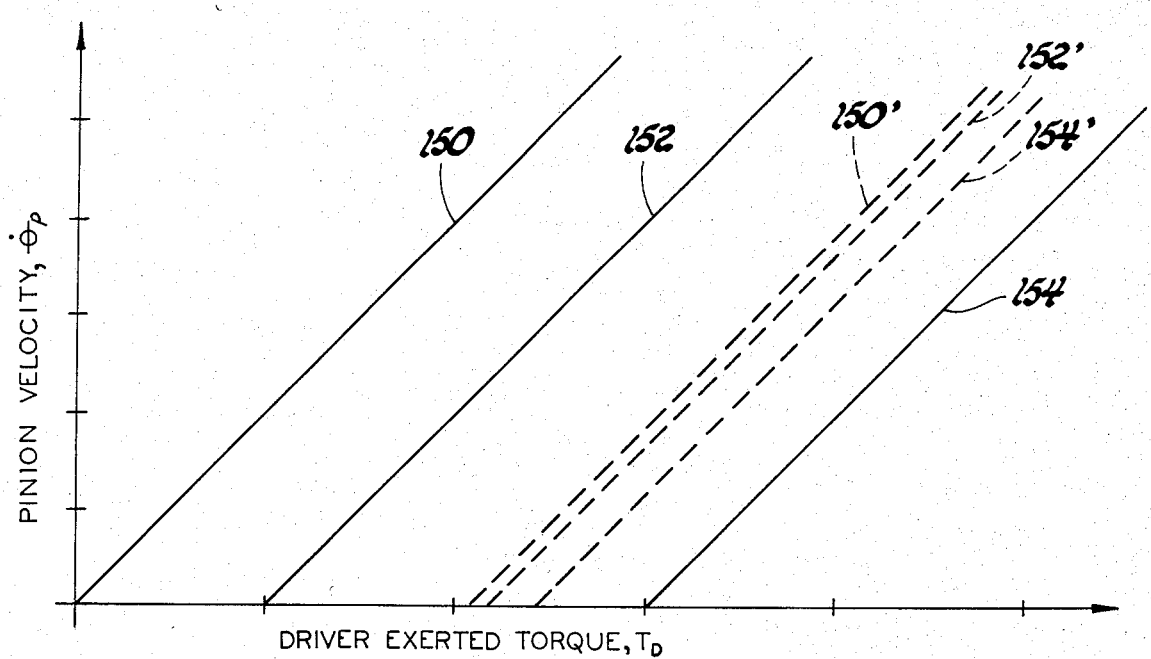
FIG. 3 is a graph depicting the steady state motor velocity ($\theta_p$) as a function of the operator exerted steering torque ($T_D$).

The operation of a system according to this invention is graphically represented by the broken traces in FIG. 3. The traces 150', 152' and 154' represent the relationship between the pinion gear velocity or rate of steer and operator exerted steering torque for the same levels of road load force as depicted by the traces 150, 152 and 154, respectively. While the rate of steer is still directly proportional to the operator exerted torque, it is substantially independent of the level of road load. Thus, the operator of the vehicle receives the same steering response for a given level of torque exerted on steering wheel 22 regardless of the vehicle speed and regardless of the tire and road surface condition.

Figure 4:
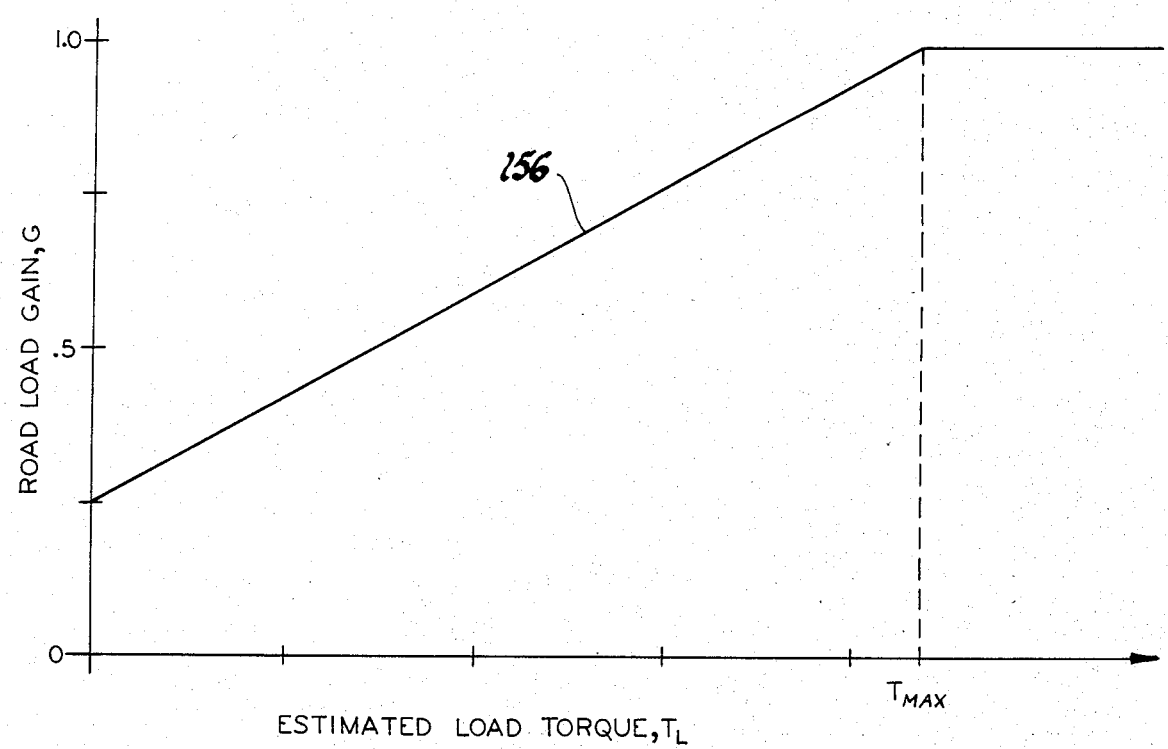
FIG. 4 is a graph depicting the road load gain term (G) as a function of the computed road load force ($T_L$).

The above effect is achieved according to this invention by estimating the level of road load and by adjusting the torque gain of the system in accordance therewith. If the road load increases, the torque gain is increased to increase the level of assist torque. If the road load decreases, the torque gain is decreased to decrease the level of assist torque. Although the road load torque $T_L$ is difficult to measure directly, it may be estimated as a function of the driver exerted torque $T_D$ and the resulting motor torque $T_M$, velocity $\theta_p$, and acceleration $\theta_p$ according to the expression:

$$T_L = T_D + T_M - B\theta_p - J\theta_p$$

where B and J represent the mechanical damping and inertia coefficients of the steering system. The driver exerted torque $T_D$ is obtained from torque transducer 40. The motor torque $T_M$ is estimated by measuring the motor current, and the motor velocity $\theta_p$ is obtained from speed transducer 47. The motor acceleration $\theta_p$ is mathematically derived from the output of speed transducer 47, and the mechanical damping and inertia coefficients B and J are either estimated or measured for a given steering system geometry. In operation, the controller 36 determines the operator exerted steering torque, and the motor velocity and current, and computes therefrom the level of road load. A look-up table is used to determine a road load gain factor G as a function of the estimated road load (as shown in FIG. 4) and motor 32 is energized as a function of the operator exerted steering torque and the road load gain factor G.

The above control functions are performed by the microcomputer-based logic unit 50 depicted in FIG. 2. As schematically depicted in that figure, the microcomputer-based logic unit essentially comprises a microcomputer (μC) 140, an Input/Output (I/O) device 142 which communicates with microcomputer 140 via an address-and-control bus 144 and a bi-directional data bus 146, and a high frequency clock (C) 148 for supplying microcomputer 140 with a high frequency pulse train for controlling the operational timing of the same. The microcomputer 140 is preferably of the type including internal Random-Access-Memory (RAM), Read-Only-Memory (ROM) and timing circuitry, one such being the MC6801 microcomputer manufactured by Motorola Semiconductor Products, Inc., Austin, Tex. Input/Output device 142 includes circuitry for converting the analog input signals on lines 42 and 120 to a digital format and driver circuitry for developing a pulse-width-modulated signal on left output line 54 or right output line 56 for controlling the conduction of driver transistors 90 and 88 in response to control signals developed by microcomputer 140. The Read-Only-Memory (ROM) portion of microcomputer 140 stores the road load gain factor look-up table and program instructions to be executed for performing the control functions of this invention. The Random-Access-Memory (RAM) portion is used for the temporary storage of input and output values and computational results during the execution of the program instructions stored in the Read-Only-Memory (ROM).

Figure 5:
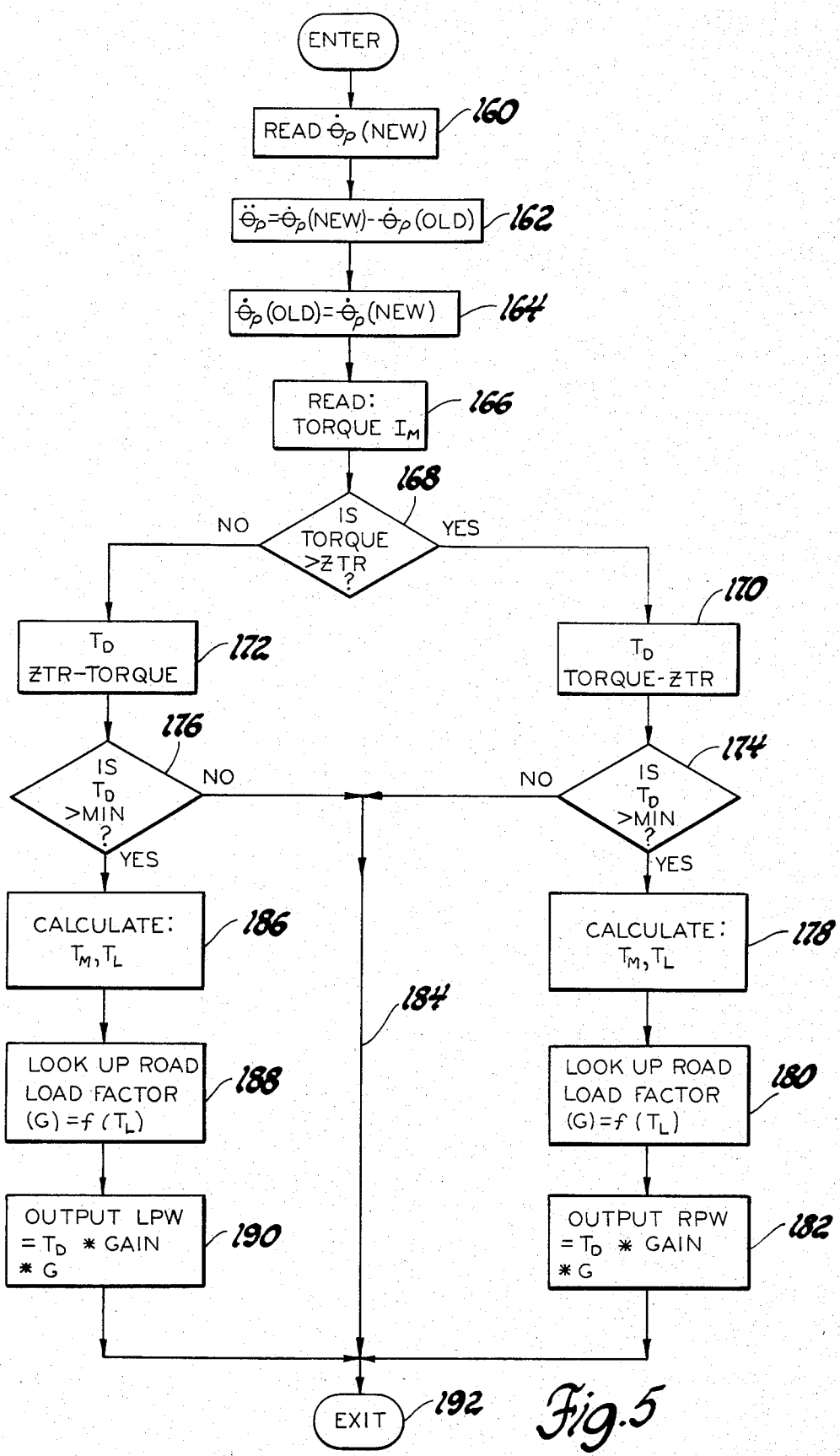
FIG. 5 is a flow diagram for implementing the control functions of this invention with the microcomputer-based logic unit depicted in FIG. 2 herein.

The flow diagram of FIG. 5 represents the program instructions stored in microcomputer 140 for performing the control functions of this invention. Preferably, the program instructions are periodically executed by microcomputer 140 at a rate of not less then once every 100 microseconds. As will be well-known to those skilled in the art, such control may be accomplished by generating an interrupt internal to microcomputer 140 and by directing the microcomputer 140 to execute the flow diagram program instructions at the initiation of each such interrupt. At the initiation of each such interrupt, instruction blocks 160 and 162 are executed to read the current pinion gear velocity $\theta_p$ (NEW) and to calculate the pinion gear acceleration $\ddot{\theta}_p$ as a function of the difference between $\theta_p$ (NEW) and the previously read pinion gear velocity $\theta_p$ (OLD). Since the program instructions are executed on a fixed and periodic basis, the pinion gear velocity difference defined in instruction block 162 may be directly related to the pinion gear acceleration $\ddot{\theta}_p$ by a proportionality constant. Such constant may be incorporated within the mechanical inertia coefficient J for the purpose of computing the road load $T_L$. After determining the pinion gear velocity and acceleration, instruction block 164 is executed to set the variable $\theta_p$ (OLD) equal to $\theta_p$ (NEW) for use in determining the pinion gear acceleration $\ddot{\theta}_p$ the next time the instruction block 162 is executed. At instruction block 166, the torque transducer output signal (TORQ) on line 42 and the motor current signal ($I_m$) on line 48 are read. Then instruction block 168 is executed to compare the torque transducer output signal TORQ with a zero torque reference ZTR to determine if lefthand or righthand operator steering torque is indicated. If the output signal TORQ is greater than the zero torque reference ZTR, righthand operator exerted steering torque is indicated and instruction block 170 is executed to determine the magnitude of such torque $T_D$ according to the difference (TORQ−ZTR). If the torque transducer output signal TORQ is less than the zero torque reference ZTR, lefthand operator exerted steering torque is indicated and instruction block 172 is executed to determine the magnitude of such torque $T_D$ according to the quantity (ZTR−TORQ). Instruction blocks 174 or 176 are then executed to compare the operator exerted steering torque $T_D$ to a minimum torque value MIN representative of an operator exerted torque value at or below which no torque assist should be provided. If righthand steering torque is indicated and the torque $T_D$ is greater than the minimum torque value MIN, instruction blocks 178, 180 and 182 are executed to determine and output the appropriate energization signals for motor 32 on right output line 56. If not, the execution of instruction blocks 178, 180 and 182 is skipped, as indicated by flow diagram line 184. Similarly, if lefthand operator exerted steering torque is indicated and the torque $T_D$ is greater than the minimum torque value MIN, instruction blocks 186, 188 and 190 are executed to determine and output the appropriate energization signal for motor 32 on left output line 54. If not, the execution of instruction blocks 186, 188 and 190 is skipped as indicated by flow diagram line 184.

The instruction blocks 178 and 186 serve to compute the motor torque $T_M$ and the road load torque $T_L$. The motor torque $T_M$ is computed as a direct function of the motor current $I_m$ and previously known motor constants. As described above, the road load torque $T_L$ is determined as a function of the motor torque $T_M$, the operator exerted torque $T_D$, the mechanical damping ($B\dot{\theta}_p$) and the mechanical inertia ($J\ddot{\theta}_p$). At instruction blocks 180 and 188, a road load gain factor G is determined as a function of the estimated road load torque $T_L$. Such relationship may be previously stored in the microcomputer Read-Only-Memory in the form of a look-up table as graphically depicted by the trace 156 in FIG. 4. As illustrated in that figure, the gain factor G is directly proportional to the estimated road load torque $T_L$. The value $T_{MAX}$ on the road load torque axis corresponds to the highest expected value of road load torque for normal operating conditions, and the gain term remains at a value 1 for estimated road load torque values in excess of $T_{MAX}$. At instruction blocks 182 and 190, the energization pulse width for motor 32 is computed as a function of the operator exerted torque $T_D$, a gain term GAIN, and the road load gain factor G. Instruction block 182 determines a righthand pulse width (RPW) and outputs a signal representative of the same on right output line 56. Instruction block 190 determines a left pulse width (LPW) and outputs the same on left output line 54. Execution of the flow diagram is terminated at the exit block 192 and the flow diagram is re-executed as described above at the initiation of the next interrupt.

As indicated above, the torque gain of the power steering system is represented by the quantity (GAIN *G). The term GAIN is fixed and chosen to provide an adequate level of power assist during relatively high levels of road load as might be encountered during parking maneuvers. As illustrated in FIG. 4, the road load gain factor G is a multiplier having a maximum value of 1 which is attained at the maximum level of road load torque $T_{MAX}$. For lower levels of road load torque $T_L$, the road load gain term G is less than 1, thereby attenuating the torque gain of the power steering system to decrease the level of assist torque. The slope and shape of the trace 156 in FIG. 4 is theoretically or empirically determined as a function of the steering system parameters such that the resulting relationship between the operator exerted steering torque and the rate of steer thereby effected is substantially independent of the level of road load. As such, the operator will achieve substantially the same rate of steer for a given level of torque exerted on steering wheel 22 whether the vehicle wheels 16 are engaging a dry road surface or an ice covered road surface. As a result, the response of the vehicle to a steering torque input by the operator is more predictable and the operator need not react by decreasing the torque applied to steering wheel 22 to prevent oversteer when driving on ice or oil covered road surfaces.

While this invention has been described with reference to the illustrated embodiment, it will be understood that various modifications thereto may occur to those skilled in the art. For example, the DC motor 32 could be of wound field or brushless construction, which would require somewhat different drive circuitry. Systems incorporating such modifications may fall within the scope of this invention which is defined by the appended claims.

The embodiments of the invention in which an exclusive property or privilege is claimed are defined as follows:

1. For a motor vehicle steering system including a dirigible wheel adapted to be frictionally engaged by a road surface and an operator manipulated steering wheel connected to said dirigible wheel for exerting a steering torque on said dirigible wheel in opposition to the road load torque determined by the frictional engagement between said dirigible wheel and said road surface, apparatus comprising:

power assist means including an electric motor energizable to exert a steering assist torque on said dirigible wheel in accordance with the value of an electrical control signal applied thereto;

control means responsive to the operator exerted steering torque for developing a control signal for energizing said electric motor to produce steering assist torque which aids the operator exerted steering torque; and means responsive to the operator exerted steering torque and the resulting steering assist torque produced by said electric motor for developing a road load torque term and for adjusting the value of said control signal in accordance therewith such that the energization of said electric motor is reduced with decreasing road load torque, whereby the relation between the operator exerted steering torque and the resulting rate of steer of said dirigible wheel is substantially insensitive to a reduction in the level of road load torque.

2. For a motor vehicle steering system including a dirigible wheel adapted to be frictionally engaged by a road surface, an operator manipulated steering wheel connected to said dirigible wheel for exerting a steering torque $T_D$ thereon in opposition to the road load torque $T_L$ determined by the frictional engagement between said dirigible wheel and said road surface, and an electric motor mechanically connected to said dirigible wheel and energizable to exert steering assist torque $T_M$ thereon in accordance with the value of a control signal applied thereto; a method of operation, comprising the steps of:

measuring the operator exerted steering torque $T_D$ and developing a motor control signal in accordance therewith for producing steering assist torque $T_M$ which aids the operator exerted steering torque $T_D$;

determining the level of road load torque $T_L$ substantially according to the expression $$T_L = T_D + T_M - B\theta_p - J\theta_p$$

where $\theta_p$ is the rate of steering, and $B\theta_p$ and $J\theta_p$ represent the damping and inertia of the steering system; and developing a road load gain term as a function of the level of road load torque $T_L$, and combining such gain term with said motor control signal to produce steering assist torque $T_M$ that decreases with decreasing road load torque $T_L$ such that the relation between operator exerted steering torque $T_D$ and the resulting rate of steer $\theta_p$ is substantially insensitive to the level of road load torque $T_L$.

* * * * *